United States Patent [19]
Yoshida et al.

[11] Patent Number: 6,101,171
[45] Date of Patent: Aug. 8, 2000

[54] SLOT BY SLOT PS/CS SWITCHING APPARATUS WITHIN THE PERSONAL HANDY PHONE SYSTEM

[75] Inventors: Satoshi Yoshida, Nice; Patrick Feyfant, Roulon; Varenka Martin; Laurent Winckel, both of Antibes; Philippe Gaglione, Mandelieu; Oliver Weigelt; Denis Archambaud, both of Antibes, all of France

[73] Assignee: VSLI Technology, Inc., San Jose, Calif.

[21] Appl. No.: 08/995,062

[22] Filed: Dec. 19, 1997

[51] Int. Cl.[7] .............................. H04J 3/00; H04B 7/212; H04B 7/15

[52] U.S. Cl. ........................ 370/280; 370/321; 370/337; 455/11.1

[58] Field of Search ...................................... 370/321, 324, 370/337, 347, 350, 280, 215, 327, 501, 492; 455/11.1, 13.1, 13.2

[56] References Cited

PUBLICATIONS

Association of Radio Industries and Businesses (ARIB), "Personal Handy Phone System ARIB Standard", version 2 RCR STD–28, Dec. 26, 1995.

Ministry of Posts and Telecommunications, Japan, "Personal Handy–Phone System (PHS) Guidebook", Japan.

Primary Examiner—Alpus H. Hsu
Assistant Examiner—Afsar M. Qureshi
Attorney, Agent, or Firm—Wagner, Murabito & Hao LLP

[57] ABSTRACT

A method and system that enables a wireless repeater within the personal handy phone system to switch the communication mode of each slot within its communication interface. Specifically, the repeater is able to function as a cell station while communicating with a portable station and function as a portable station while communicating with a cell station. For instance, when the repeater communicates with a cell station, it switches the communication mode of a desired slot within its communication interface into portable station communication mode. Conversely, when the repeater communicates with a portable station, it switches a desired slot within its communication interface into cell station communication mode. Since a repeater implemented with the present invention is able to switch the communication mode of each slot within its communication interface, the amount of internal circuitry required within the repeater is significantly reduced. Specifically, the internal circuitry implemented within an embodiment of a wireless repeater in accordance with the present invention includes a radio circuit and a baseband circuit. The present invention enables the significantly reduced internal circuitry of the repeater to perform the dual function of communicating with cell stations and portable stations using a single communication interface. As a result of significantly reducing the internal circuitry of the repeater, it is less expensive to manufacture and requires less power to operate.

12 Claims, 12 Drawing Sheets

SLOT BY SLOT PS/CS SWITCHING APPARATUS WITHIN THE PERSONAL HANDY PHONE SYSTEM

TECHNICAL FIELD

The present invention relates to the field of wireless telecommunications. More specifically, the present invention relates to the field of the personal handy phone system.

BACKGROUND ART

Within the field of wireless telecommunications systems, there exists a system referred to as the personal handy phone system, otherwise known as PHS. Within the personal handy phone system, a user of a portable or personal station (PS) is able to communicate with a user of another telecommunication device by way of a cell station (CS). When an obstruction (e.g., building or trees) is located between a cell station and a portable station preventing the two devices from communicating, a prior art wireless repeater acts as an intermediate transmitter/receiver station when installed between the cell station and the portable station. For example, the wireless repeater within the personal handy phone system receives a transmitted signal from the cell station and retransmits it to the portable station. Conversely, the repeater receives a transmitted signal from the portable station and retransmits it to the cell station.

The internal circuitry enabling a prior art wireless repeater to properly operate includes two radio circuits and two baseband circuits. Within a prior art repeater, the components including a radio circuit and a baseband circuit operate in conjunction to receive and transmit data signals only with cell stations. The remaining identical set of internal circuitry within the prior art repeater operate in conjunction to receive and transmit data signals only with portable stations. The problem with the prior art repeater is that it is more expensive to manufacture because of the duplicate internal circuitry required for its operation. Another disadvantage of the prior art repeater is that the duplicate internal circuitry requires the repeater to consume more power while operating.

Therefore, it would be advantageous to provide a personal handy phone system wireless repeater that requires significantly less internal circuitry to communicate with cell stations and portable stations while optimizing power consumption. Manufacturing and design complexities can be reduced in a repeater having less internal circuitry and reliability can be improved. The present invention provides these advantages.

DISCLOSURE OF THE INVENTION

The present invention includes a method and system that enables a wireless repeater within the personal handy phone system to switch the communication mode of each slot within its communication interface. Specifically, an embodiment of a repeater in accordance with the present invention is able to function as a cell station while communicating with a portable station and function as a portable station while communicating with a cell station. For instance, when an embodiment of a repeater in accordance with the present invention communicates with a cell station, it switches the communication mode of a desired slot within its communication interface into portable station communication mode. Conversely, when the repeater communicates with a portable station, it switches a desired slot within its communication interface into cell station communication mode.

Since an embodiment of the present invention enables a wireless repeater to switch the communication mode of each slot within its communication interface, the amount of internal circuitry required within the repeater is significantly reduced. Specifically, the internal circuitry implemented within an embodiment of a wireless repeater in accordance with the present invention includes a radio circuit and a baseband circuit. The present invention enables the significantly reduced internal circuitry of the repeater to advantageously perform the dual function of communicating with cell stations and portable stations using a single communication interface. As a result of significantly reducing the internal circuitry of the repeater, it is less expensive to manufacture and requires less power to operate.

One method of the present invention within a personal handy phone system for enabling a wireless repeater to switch the communication mode of each slot of a communication interface is described below. This method comprises the steps of: on first detection of a signal, the wireless repeater determines whether a cell station or a first portable station of the personal handy phone system transmitted the signal. The wireless repeater switches a first receiving slot of the communication interface to a cell station communication mode if the signal was transmitted by the first portable station. The first receiving slot is for receiving the signal from the first portable station. The wireless repeater switches the first receiving slot of the communication interface to a portable station communication mode if the signal was transmitted by the cell station. The first receiving slot is for receiving the signal from the cell station.

Later, the wireless repeater switches a first transmit slot of the communication interface to the cell station communication mode if the signal is to be transmitted to the first portable station. The first transmit slot is for transmitting the signal to the first portable station. The wireless repeater switches the first transmit slot of the communication interface to the portable station communication mode if the signal is to be transmitted to the cell station. The first transmit slot is for transmitting the signal to the cell station. The communication interface comprises a predetermined number of receive slots and a predetermined number of transmit slots.

Furthermore, the wireless repeater receives a second signal from the cell station and switches a second transmit slot of the communication interface to the cell station communication mode if the signal is to be transmitted to a second portable station. The second transmit slot is for transmitting the second signal to the second portable station.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

In the following detailed description of the present invention, a system for enabling a wireless repeater within the personal handy phone system to switch the communication mode of each slot within its communication interface, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention operates within the communication system known as the personal handy phone system which provides its users wireless voice communication. Along with providing its users wireless voice communication, the personal handy phone system also provides facsimile (fax) and multimedia communication capabilities. The personal handy phone system has the ability to operate both indoors and outdoors, which offers greater communication opportunities. For instance, the indoor operations include using it within office spaces, homes, hotels, shopping malls and airports. Furthermore, the outdoor operations of the personal handy phone system include using it within rural, suburban, and city areas. The personal handy phone system is well known by those skilled in the art, and is discussed in a number of publications, such as Personal Handy-Phone System (PHS) Guidebook by the Ministry of Posts & Telecommunications, Japan (1995) and Personal Handy Phone System ARIB Standard Version 2 by the Association of Radio Industries and Businesses, (1995).

Figure 1A:
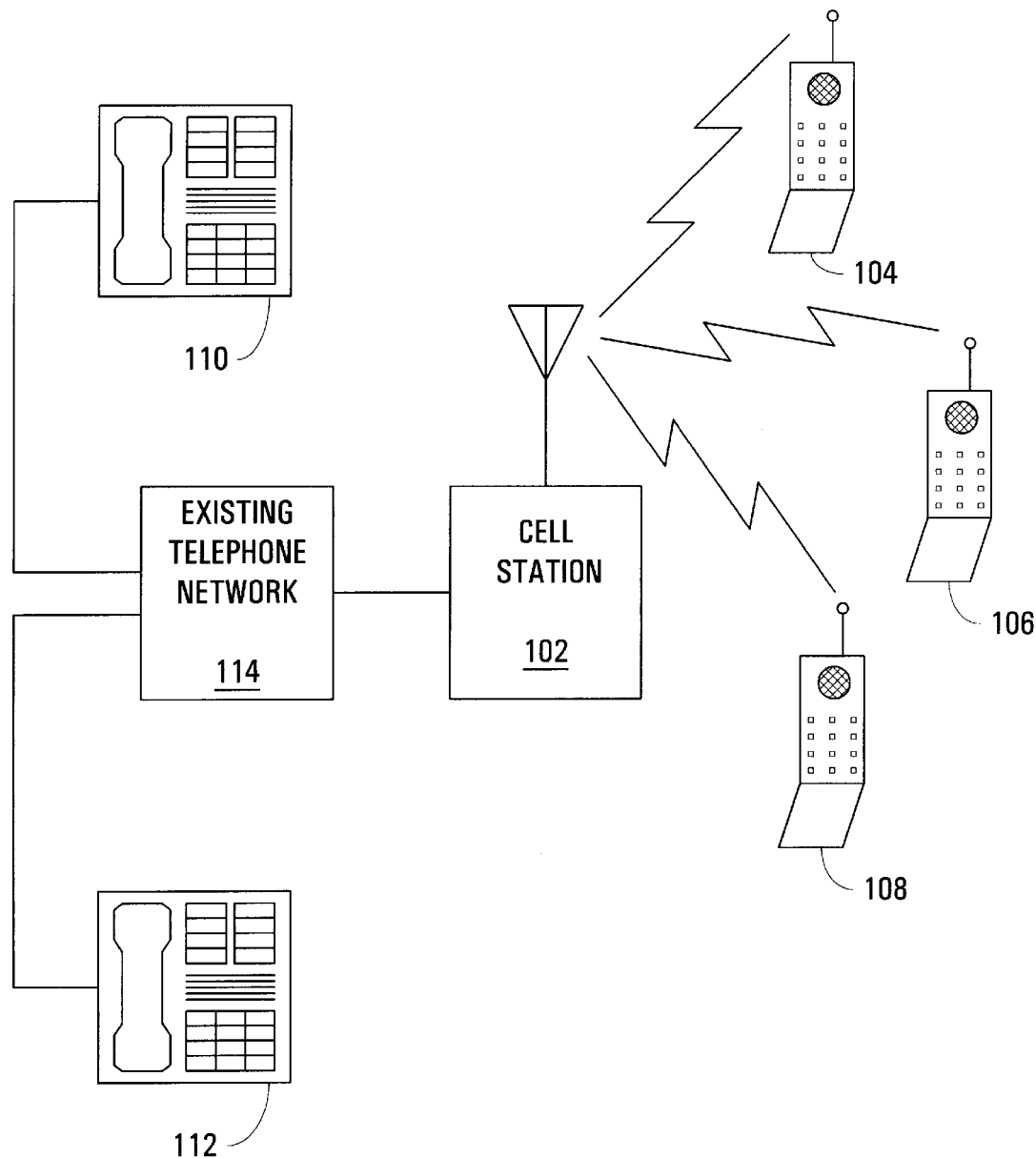
FIG. 1A illustrates a general overview of the personal handy phone system in which the present invention operates.

FIG. 1A illustrates a general overview of the personal handy phone system 100 in which the present invention operates. The two main components that are used within the personal handy phone system are a cell station (CS) and a personal or portable station (PS). Referring to FIG. 1A, portable stations 104–108 are similar in function to cordless telephone handsets and have the ability to transmit and receive voice information along with other types of data. Cell station 102 is a transmitter and receiver base station which can be implemented by coupling it into the existing public telephone network 114. Implemented in this way, cell station 102 enables the users of portable stations 104–108 to communicate with each other and with the users of telephones 110 and 112, which are coupled by wire to the existing public telephone network 114. The information that is communicated between cell station 102 and portable stations 104–108 is the same type of information (e.g., voice/data etc.) that can conventionally be transferred and received over a public telephone wire network system. Instead of communicating over a wire network, the personal handy phone system uses a wireless digital radio interface to communicate information between cell station 102 and portable stations 104–108.

Figure 1B:
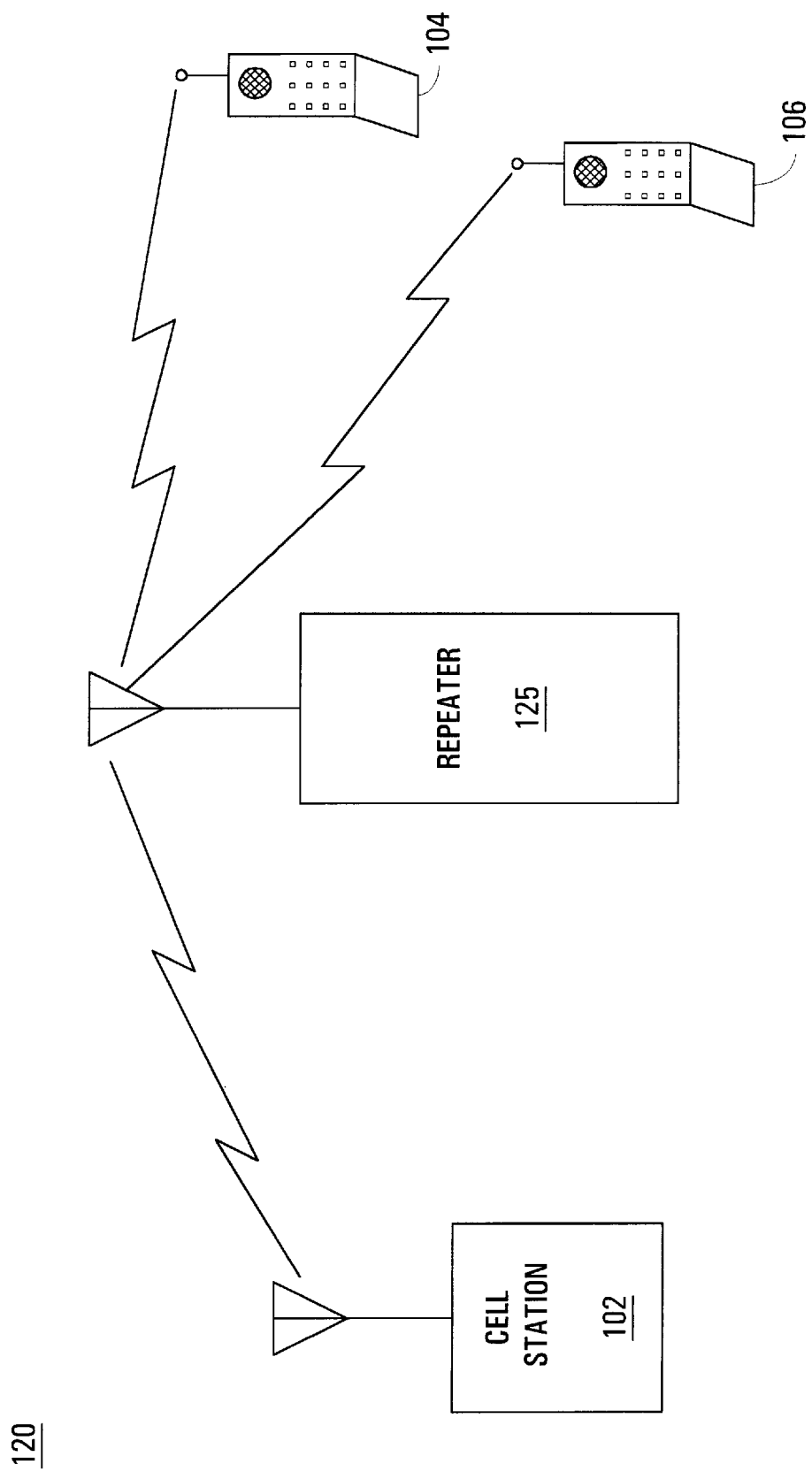
FIG. 1B illustrates an embodiment of a repeater in accordance with the present invention operating within the personal handy phone system.

FIG. 1B illustrates an embodiment of repeater 125 in accordance with the present invention operating within the personal handy phone system 120. Repeater 125 acts as an intermediate transmitter/receiver station located between cell station 102 and portable stations 104 and 106 when obstructions (e.g., trees or buildings) prevent them from directly communicating. Repeater 125 also utilizes the personal handy phone system wireless digital radio interface to communicate with cell station 102 and portable stations 104 and 106. One embodiment of the digital radio interface used by the personal handy phone system 120 is a time division multiple access capability with time division duplexing (TDMA-TDD).

Figure 2A:
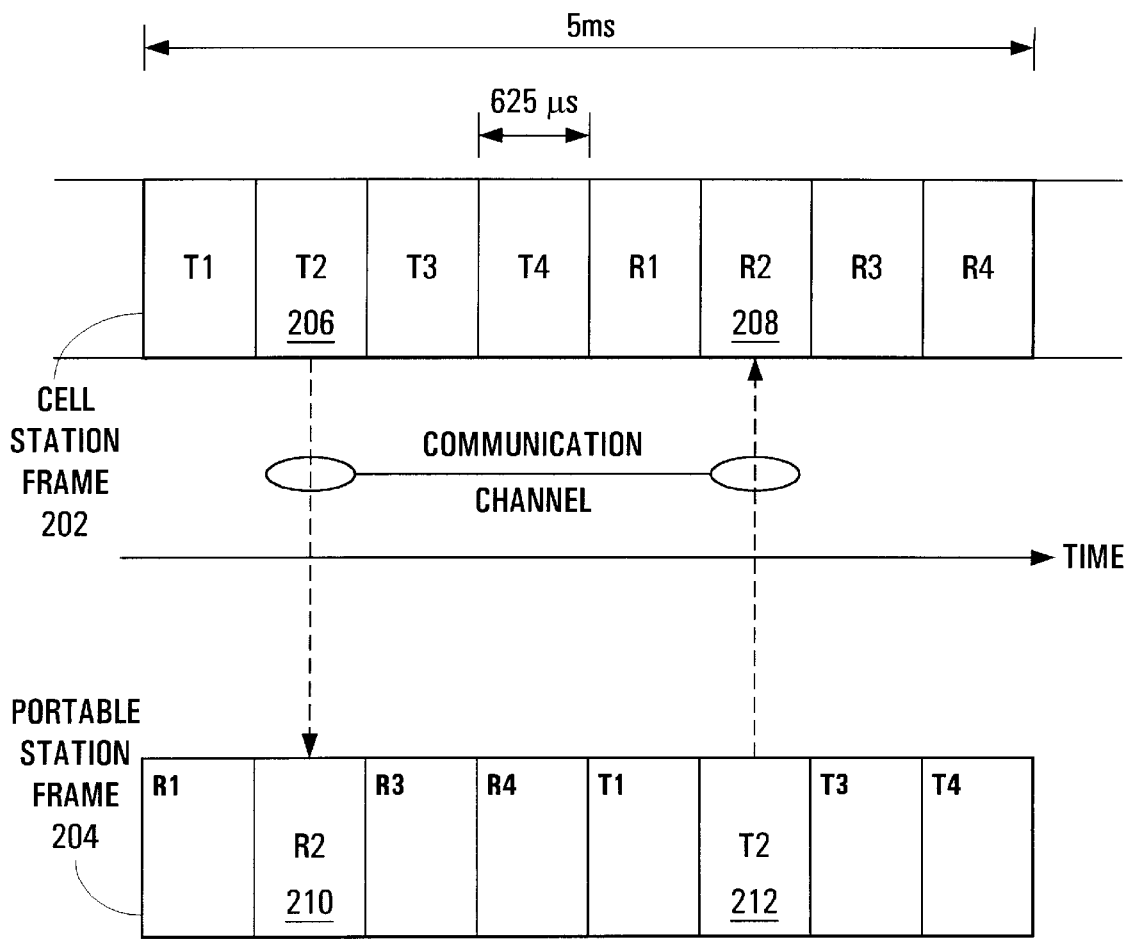
FIG. 2A illustrates one embodiment of time division duplexed communication frames used within the personal handy phone system as a digital radio interface between cell stations, portable stations and wireless repeaters.

FIG. 2A illustrates time division duplexed frames 202 and 204, which are used within personal handy phone system 100 of FIG. 1A as the digital radio interface between cell station 102 and multiple portable stations 104–108. Frames 202 and 204 each have a time interval of 5 milliseconds which is divided into eight communication slots, four slots for receiving data (R1, R2, R3, R4) and four slots for transmitting data (T1, T2, T3, T4). Each communication slot within frames 202 and 204 has a time interval of 625 microseconds. The arrangement of the receiving slots and transmitting slots within frames 202 and 204 can be altered in order to facilitate different communication situations (e.g., utilizing repeater 125).

Cell station 102 of FIG. 2A is able to use all the receiving slots and transmitting slots of cell station frame 202 in order to simultaneously communicate with four portable stations. Conversely, portable station 104 only utilizes one receiving slot (e.g., slot 210) and one transmitting slot (e.g., slot 212) of portable station frame 204 when it communicates with cell station 102. For example, cell station 102 transmits data to portable station 104 during slot 206, which is the second transmitting slot of frame 202. Portable station 104 receives the transmitted data during slot 210, which is the second receiving slot of frame 204. Later, portable station 104 transmits data to cell station 102 during slot 212, which is the second transmitting slot of frame 204. Cell station 102 receives the transmitted data during slot 208, which is the second receiving slot of frame 202. In this manner, an independent communication channel is established between portable station 104 and cell station 102 for the duration of the communication session. Therefore, cell station frame 202 allows up to four logical channels of simultaneous communication, e.g., between cell station 102 and four portable stations.

Figure 2B:
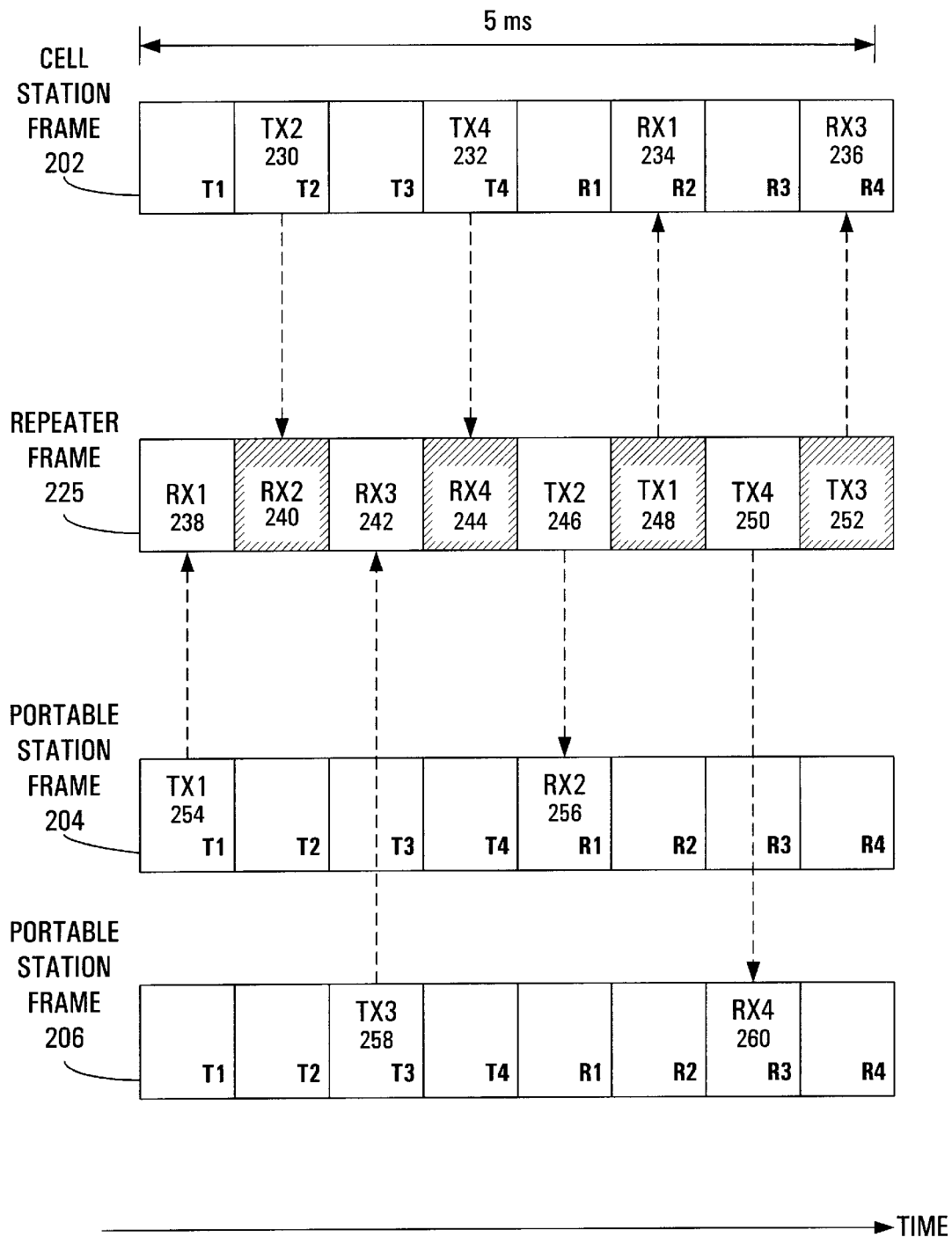
FIG. 2B illustrates the communication slot based operation of a communication frame within a repeater implemented with an embodiment of the present invention as it communicates with a cell station and two portable stations.

FIG. 2B illustrates the communication slot based operation of communication frame 225 within wireless repeater 125 of FIG. 1B, which is implemented with an embodiment of the present invention, as it communicates with cell station 102 and portable stations 104 and 106. In order to facilitate communication utilizing repeater 125 between portable station 104 and cell station 102, the receiving slots and transmitting slots of frame 204 are arranged as shown in FIG. 2B. When implemented with an embodiment of the present invention, repeater 125 has the ability to individually switch the communication mode of slots 238–252 between the portable station communication mode and the cell station communication mode. By being able to switch the communication modes of slots 238–252, repeater 125 is able to perform the dual function of communicating with both cell stations (e.g., cell station 100) and portable stations (e.g., portable stations 104 and 106) while using significantly less internal circuitry than a prior art wireless repeater within the personal handy phone system.

With reference to FIG. 2B, when any one of slots 238–252 within repeater frame 225 is switched into personal station communication mode, repeater 125 of FIG. 1B is able to communicate during that slot with cell station 102. Furthermore, when any one of slots 238–252 is switched into cell station communication mode, repeater 125 is able to communicate during that slot with either portable stations 104 or 106. Repeater 125 performs differently depending on the communication mode that is implemented within any one of slots 238–252. For instance, if any one of slots 238–252 is switched into portable station communication mode, repeater 125 synchronizes that slot timing according to the signal it receives from cell station 102. For example, when slot 240 of repeater frame 225 is receiving data from cell station 102, slot 240 is switched into portable station communication mode by repeater 125 and is synchronized to the incoming signal. Conversely, when any of slots 238–252 are switched into cell station communication mode, repeater 125 does not synchronize that slot to the signal it receives from a portable station. Instead, repeater 125 assumes that the synchronization is performed by the portable station that is sending the data signal. For example, when slot 242 of repeater frame 225 is receiving data from portable station 106, slot 242 is switched into cell station communication mode by repeater 125 and is not synchronized to the incoming signal.

The following discussion explains more fully the manner in which repeater frame 225 of FIG. 2B is utilized by repeater 125 of FIG. 1B while communicating with cell station 102 and portable stations 104 and 106. Repeater 125 is designed to be able to switch the communication mode of slots 238–252 of frame 225 in order to properly communicate with cell station 102 and portable stations 104 and 106. Striped slots 240, 244, 248 and 252 of frame 225 represent slots implemented in portable station communication mode while slots 238, 242, 246 and 250 represent slots implemented in cell station communication mode. For instance, during slot 254, the first transmitting slot of frame 204, portable station 104 transmits data (TX1) to repeater 125, which is intended for cell station 102. Since repeater 125 recognizes that the signal is sent by portable station 104, slot 238 is switched into cell station communication mode in order to receive the transmitted data from portable station 104. Later, during slot 248 of frame 225, repeater 125 transmits the data (TX1) to cell station 102, which it receives during slot 234. It is appreciated that slot 248 is switched into portable station communication mode in order for repeater 125 to communicate with cell station 102. This example demonstrates the manner in which repeater 125 is able to switch the communication mode of each slot of its communication frames to communicate with cell station 102 and portable station 104 in accordance with the present invention.

During slot 230 of frame 202 of FIG. 2B, cell station 102 of FIG. 1B transmits data (TX2) to repeater 125, which is intended for portable station 104. Repeater 125 recognizes that the signal is sent by cell station 102, slot 240 is switched into portable station communication mode in order to receive the transmitted data (TX2) from cell station 102. Within the data received during slot 240 is information indicating the particular communication channel (e.g., the first transmitting and receiving slots of frame 204) that portable station 104 is currently utilizing to communicate with cell station 102. This communication channel information is used by repeater 125 to determine which transmission slot to transmit the received data to portable station 104. Later, repeater 125 switches transmitting slot 246 of frame 225 into cell station communication mode in order to communicate with portable station 104. During slot 246, repeater 125 transmits the data (TX2) to portable station 104 which was received during slot 240. During slot 256, the first receiving slot of frame 204, portable station 104 receives the data from repeater 125.

During slot 258 of frame 206 of FIG. 2B, portable station 106 of FIG. 1B transmits data (TX3) to repeater 125, which is intended for cell station 102. Repeater 125 recognizes that the signal is sent by portable station 106, slot 242 is switched into cell station communication mode in order to receive the transmitted data (TX3) from portable station 106. Later, repeater 125 switches transmitting slot 252 of frame 225 into portable station communication mode in order to communicate with cell station 102. During slot 252, repeater 125 transmits the data (TX3) to cell station 102 which was received during slot 242. During slot 236, cell station 102 receives the data transmitted by repeater 125.

During slot 232 of frame 202 of FIG. 2B, cell station 102 of FIG. 1B transmits data (TX4) to repeater 125, which is intended for portable station 106. Repeater 125 recognizes that the signal is sent by cell station 102, then slot 244 is switched into portable station communication mode in order to receive the transmitted data (TX4) from cell station 102. Within the data received during slot 244 is information indicating the particular communication channel (e.g., the third transmitting and receiving slots of frame 206) that portable station 106 is utilizing to communicate with cell station 102 for the duration of their communication session. Later, repeater 125 switches transmitting slot 250 of frame 225 into cell station communication mode to communicate with portable station 106. During slot 250, repeater 125 transmits the data (TX4) to portable station 104 which was received during slot 244. During slot 260, the third receiving slot of frame 206, portable station 106 receives the data from repeater 125.

It is important to note that cell station 102 of FIG. 1B can receive data from repeater 125 during any of the receiving slots (T1, T2, T3, T4) of frame 202 of FIG. 2B, even though the receiving slot position does not correspond to the transmitting slot position originally used by portable stations 104 or 106. Instead, the specific transmitting slot position used by portable stations 104 or 106 is encoded within the transmitted data which is received by cell station 102. In this manner, cell station 102 is able to determine the specific receiving slot position that portable stations 104 or 106 expects to receive data from cell station 102.

Figure 3:
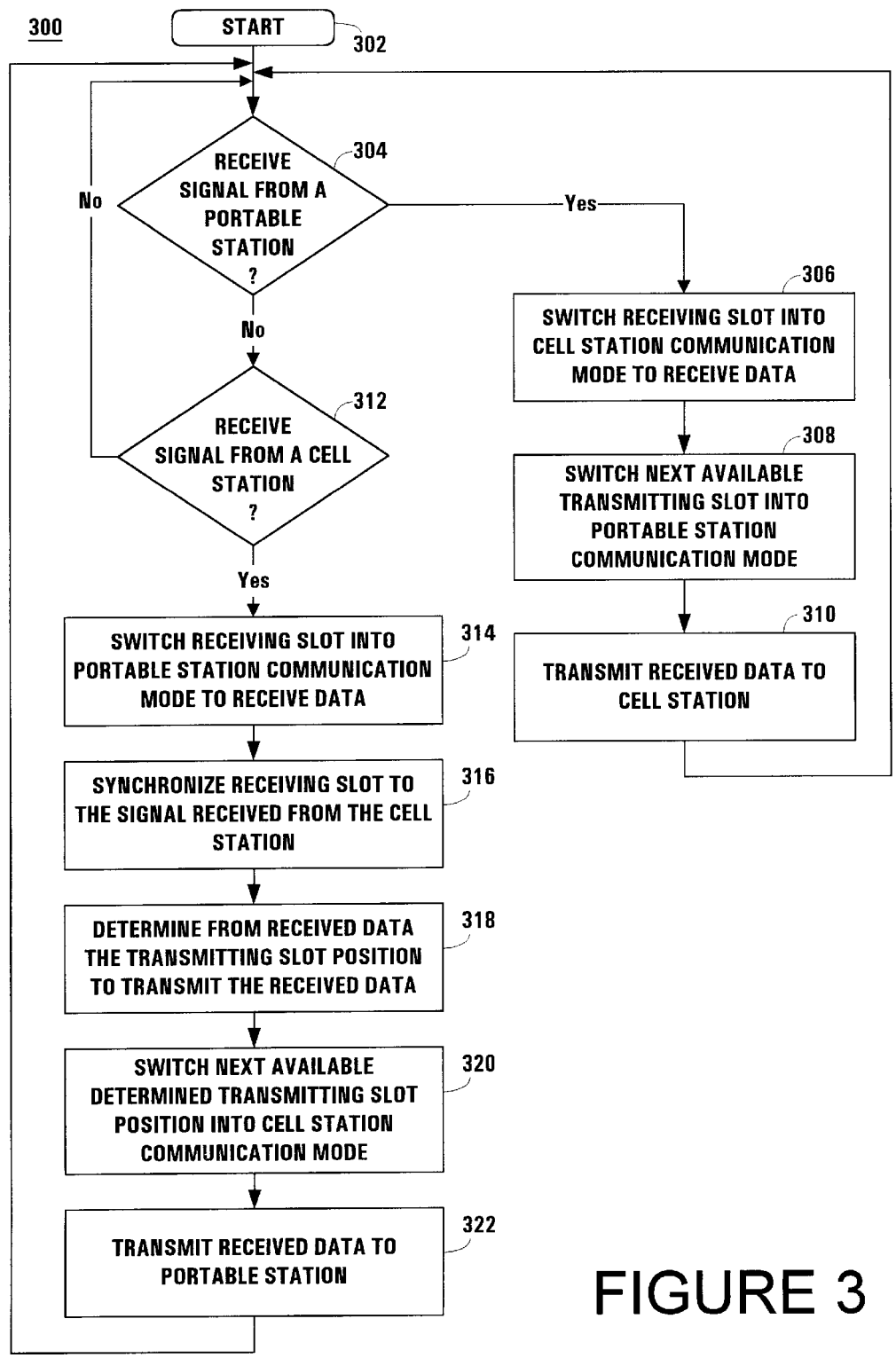
FIG. 3 shows a flowchart of one embodiment of the present invention for enabling a wireless repeater within the personal handy phone system to switch the communication mode of each slot within its communication interface.

FIG. 3 shows a flowchart of steps performed under one embodiment of the present invention for enabling a wireless repeater 125 of FIG. 1B within the personal handy phone system 120 to switch the communication mode of each slot of its communication interface. Process 300 is performed by repeater 125 for every signal that it receives from cell station 102 and portable stations 104 and 106. FIG. 3 contains process 300 which starts at step 302. Step 304 directs repeater 125 to determine if a data signal has been received from portable stations 104 or 106. At step 304, if repeater 125 has received a data signal from portable stations 104 or 106, repeater 125 is directed to proceed to step 306. Step 306 directs repeater 125 to switch the receiving slot (e.g., slot 238 of FIG. 2B) into cell station communication mode in order to receive the data signal from either portable stations 104 or 106. Step 308 directs repeater 125 to switch the next available transmitting slot (e.g., slot 248) into portable station communication mode in preparation to transmit the received data to cell station 102. Step 310 directs repeater 125 to transmit the received data to cell station 102 during the transmitting that was switched during step 308 (e.g., slot 248). Step 310 directs repeater 125 to proceed to step 304.

At step 304 of FIG. 3, if repeater 125 of FIG. 1B has not received a data signal from portable stations 104 or 106, repeater 125 is directed to proceed to step 312. Step 312 directs repeater 125 to determine if a data signal has been received from cell station 102. At step 312, if repeater 125 has not received a data signal from cell station 102, repeater 125 is directed to proceed to step 304. At step 312, if repeater 125 has received a data signal from cell station 102, repeater 125 is directed to proceed to step 314. Step 314 directs repeater 125 to switch the receiving slot (e.g., slot 240 of FIG. 2B) into portable station communication mode so that repeater 125 can receive the data signal from cell station 102. Step 316 directs repeater 125 to synchronize receiving slot 240 to the data signal that repeater 125 is receiving from cell station 102.

Once step 316 is completed, step 318 of FIG. 3 determines from the received data the particular communication channel (e.g., the first transmitting slot 254 and receiving slot 256 within frame 204 of FIG. 2B) that the portable station (e.g., portable station 104 of FIG. 1B) is currently utilizing to communicate with cell station 102. At step 318, repeater 125 is directed to use the communication channel information to determine the proper transmission slot position (e.g., slot 246 of frame 225) to transmit the received data to portable station 104. Step 320 directs repeater 125 to switch the next available determined transmission slot position (e.g., slot 246) into cell station communication mode in order to transmit the received data to portable station 104. Step 322 directs repeater 125 to transmit the received data to portable station 104 during transmitting slot 246 that was switched during step 320. Step 322 directs repeater 125 to proceed to step 304.

Figure 4:
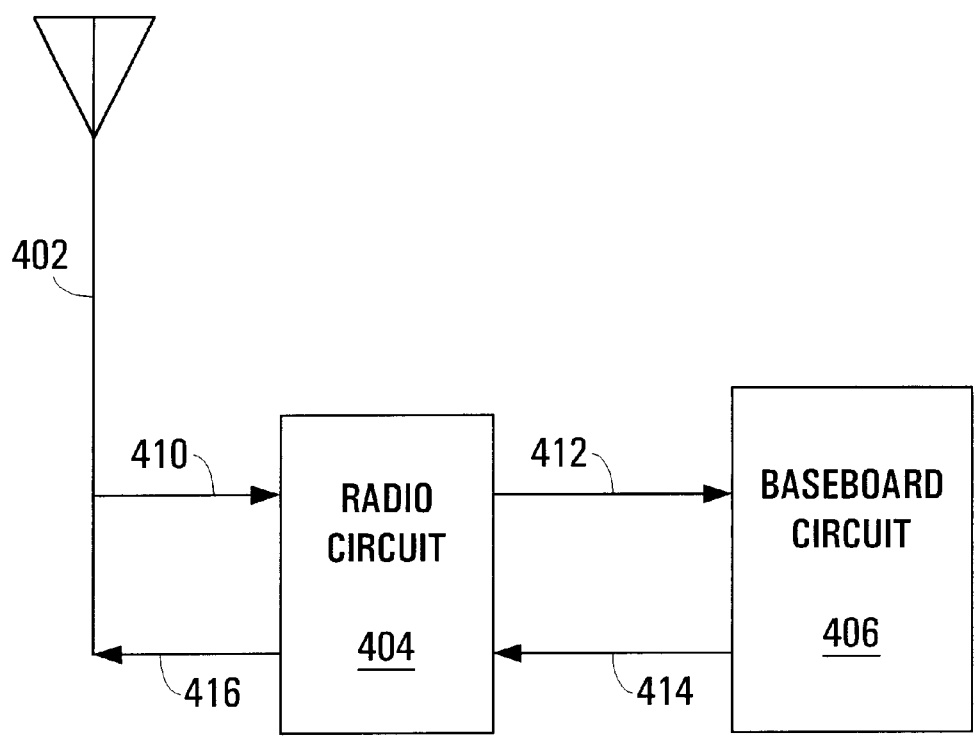
FIG. 4 illustrates a block diagram of the hardware used within an embodiment of a repeater in accordance with the present invention within the personal handy phone system.

FIG. 4 illustrates a block diagram of the hardware of circuit 400 which is used within repeater 125 of FIG. 1B, which is one embodiment of the present invention within the personal handy phone system 120. Circuit 400 of the present invention enables wireless repeater 125 to perform the dual function of communicating with cell station 102 and portable stations 104 and 106 within a single communication interface. Circuit 400 enables wireless repeater 125 to communicate with cell station 100 using one communication mode while communicating with either portable stations 104 or 106 using another communication mode of the same communication interface. One present invention embodiment of the radio interface of the personal handy phone system 120 is a 1.9 gigahertz (GHz) carrier frequency to transmit information between cell station 102, repeater 125 and portable stations 104 and 106.

The antenna 402 of FIG. 4 receives the carrier frequency signal 410 transmitted from either cell station 102 or portable stations 104 or 106, which is input into radio circuit 404. The radio circuit 404 amplifies the received carrier frequency signal 410 and then down converts it into an intermediate frequency signal 412 which is transmitted to baseband circuit 406. One present invention embodiment of the intermediate frequency signal 412 is a 10.8 megahertz (MHz) intermediate frequency signal. The baseband circuit 406 is coupled to receive the intermediate frequency signal 412 and decodes a portion of the information contained within it.

Circuit 400 of FIG. 4 is also used by repeater 125 of FIG. 1B to transmit data to cell station 102 and portable stations 104 and 106 within a single communication interface. A received signal that is stored within baseband circuit 406 is transmitted to the radio circuit 404 as an intermediate frequency signal 414. The radio circuit 404 receives the intermediate frequency signal 414 and up converts it into a carrier frequency signal 416. One present invention embodiment of the carrier frequency signals 410 and 416 are a 1.9 gigahertz (GHz) carrier frequency signal. The antenna 402 transmits the carrier frequency signal 416 to cell station 102 and portable stations 104 and 106.

Figure 5:
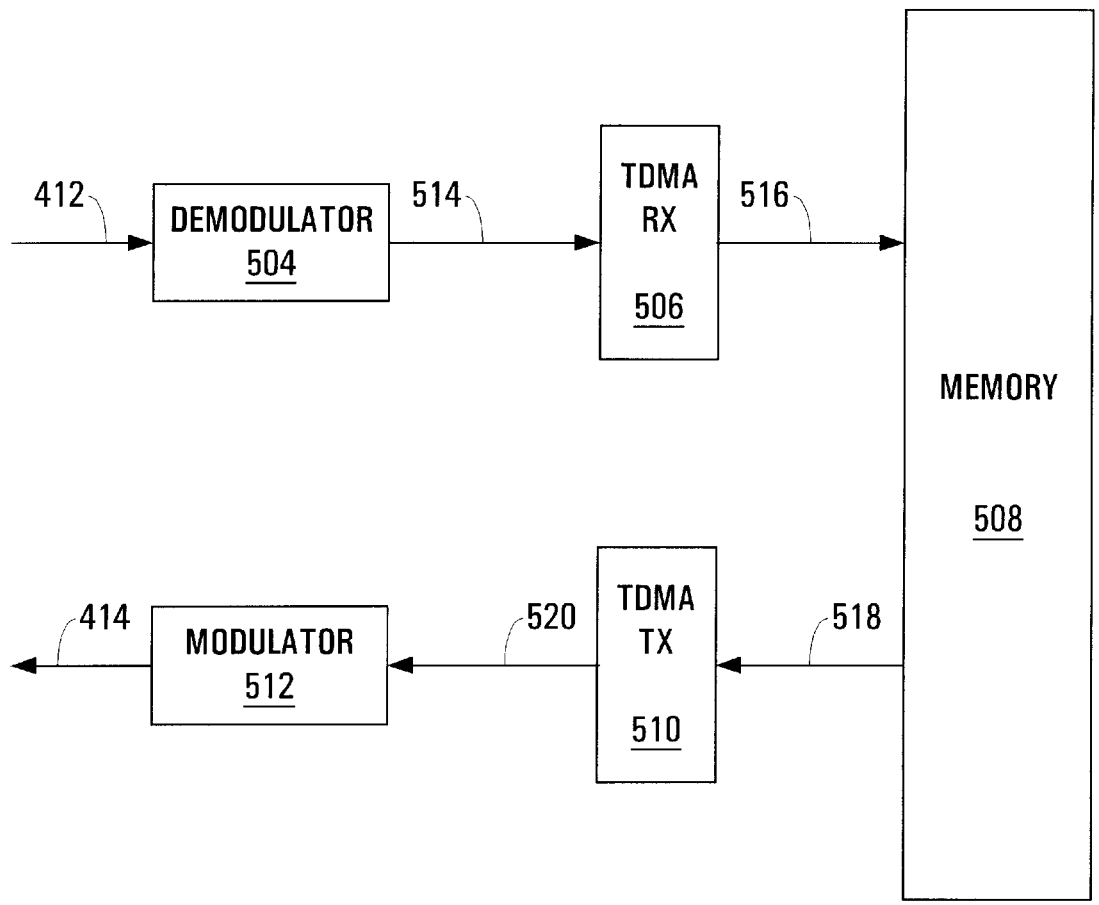
FIG. 5 illustrates a block diagram of the hardware used within the baseband circuit of FIG. 4 of one embodiment of the present invention.

FIG. 5 illustrates a block diagram of the hardware used within the baseband circuit 406 of FIG. 4 of one embodiment of the present invention. Baseband circuit 406 receives intermediate frequency signal 412 of FIG. 4 from radio circuit 404. The demodulator circuit 504 demodulates and down converts the intermediate frequency signal 412 into a digital baseband signal 514. The time division multiple access receiver (TDMA RX) circuit 506 processes the demodulated digital baseband signal 514 received from demodulator 504, which encompasses several steps. For instance, first the TDMA RX 506 detects the Unique Word of the demodulated digital baseband signal 514 and then determines its specific channel type. Next the TDMA RX 506 de-scrambles the demodulated digital baseband signal 514 and also decrypts it, if it is voice communication data. The TDMA RX 506 then calculates the cyclic redundancy check (CRC) of the demodulated digital baseband signal 514. Once the TDMA RX 506 has processed the demodulated digital baseband signal 514 into digital baseband signal 516, it is then stored within memory unit 508. One embodiment of memory unit 508 within the present invention is a 2 kilobits random access memory (RAM) unit.

Time division multiple access transmitter (TDMA TX) circuit 510 of FIG. 5 retrieves an outgoing digital baseband signal 518 from memory unit 508 and processes it, which encompasses several steps. For instance, if the outgoing digital baseband signal 518 is voice communication, the TDMA TX 510 first encrypts it. If the outgoing digital baseband signal 518 is not voice communication, TDMA TX 510 skips the encryption step. The TDMA TX 510 next scrambles the outgoing digital baseband signal 518. Next the TDMA TX 510 calculates the cyclic redundancy check (CRC) of the outgoing digital baseband signal 518. The TDMA TX 510 then assembles the slot data for the outgoing digital baseband signal 518 e.g., adding the Unique Word, the channel identifier (CI), the cyclic redundancy check (CRC), etc.

Once the TDMA TX 510 of FIG. 5 has finished processing the outgoing digital baseband signal 518 into a digital baseband signal 520, it is then transferred to modulator circuit 512. The modulator circuit 512 then up converts and modulates the digital baseband signal 520 into an intermediate frequency signal 414. The intermediate frequency signal 414 is then output from the baseband circuit 406 to the radio circuit 404 of FIG. 4.

Figure 6A:
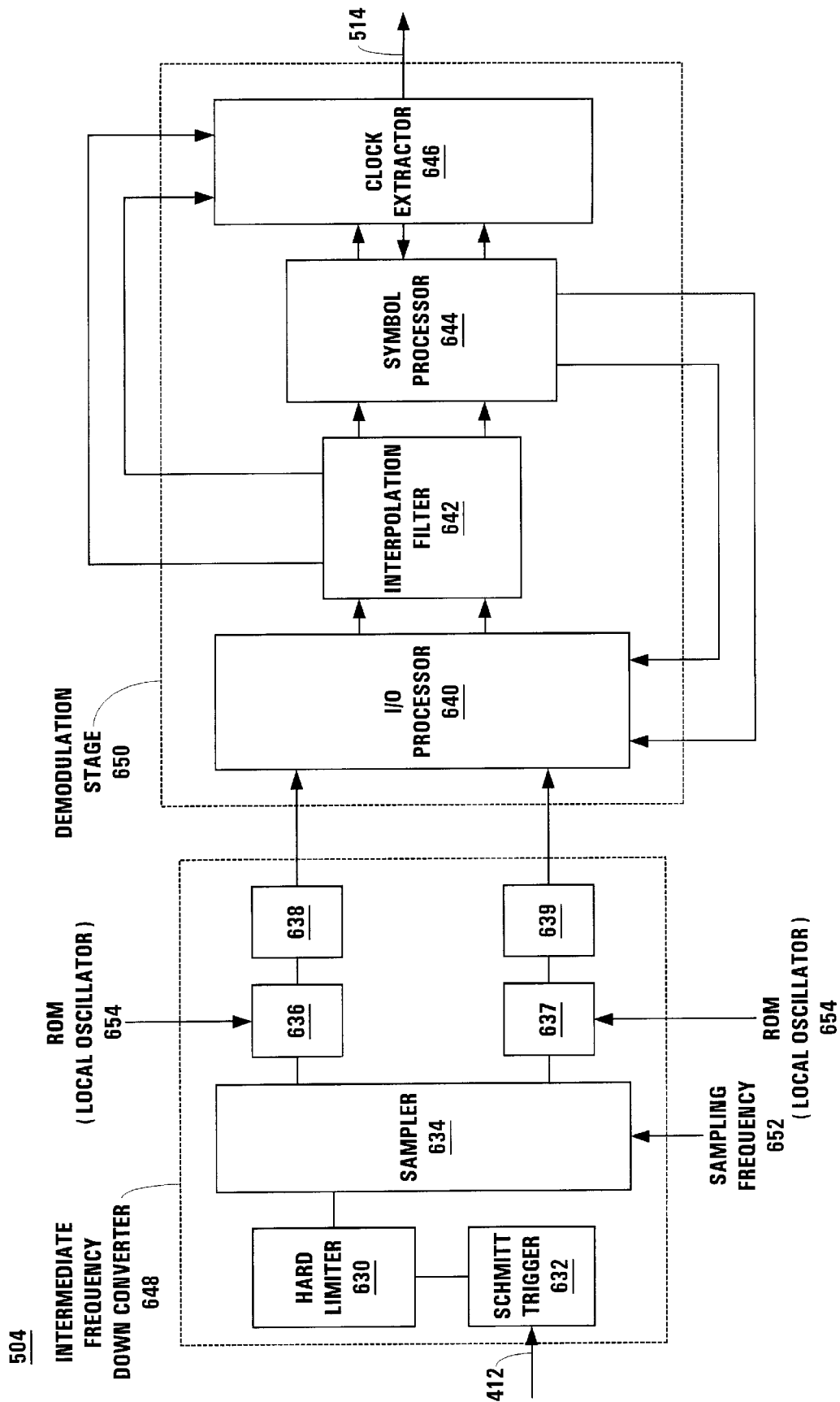
FIG. 6A illustrates a block diagram of the hardware used within the demodulator circuit of FIG. 5 of one embodiment of the present invention.

FIG. 6A illustrates a block diagram of the components used within the demodulator circuit 504 of FIG. 5, which is one embodiment of the present invention to demodulate an intermediate frequency signal 412 into a digital baseband signal 514. However, many other demodulator circuits can also be used to perform the same function as demodulator circuit 504. Within one embodiment of demodulator circuit 504 in accordance with the present invention, the intermediate frequency signal 412 output from the radio circuit 404 of FIG. 4 is received by the Schmitt trigger circuit 632 of the intermediate frequency down converter circuit 648. One embodiment of intermediate frequency signal 412 within the present invention is a 10.8 megahertz intermediate frequency signal. The Schmitt trigger circuit 632 increases the noise immunity of the received intermediate frequency signal 412. The hard limiter circuit 630 receives the output signal from the Schmitt trigger 632 and provides a threshold for the received signal with complementary metal oxide semiconductor (CMOS) levels. Sampler circuit 634 receives the output signal from the hard limiter 630 and samples it with the sampling frequency 652. One embodiment of sampling frequency 652 within the present invention is 19.2 megahertz.

The signal output from sampler 634 of FIG. 6A is received by down converters 636 and 637 which perform quadrature mixing to the received signal using the read only memory (ROM) local oscillator signal 654. The low pass filters 638 and 639 receive the output signals from the down converters 636 and 637, respectively, which remove the unwanted mixer products from the quadrature channels of the received signals. The I/Q processor 640 of the demodulation stage circuit 650 receives the output signals from the low pass filters 638 and 639 and first scales the received signals to make full use of the dynamic range. The I/Q processor 640 then calculates the differential phase by vector multiplication. Finally, within the I/Q processor 640 the effect of a frequency offset between incoming and local carrier is corrected by a rotator, controlled from the symbol processor 644.

The interpolation filter circuit 642 of FIG. 6A receives the output signals from the I/Q processor 640 and raises the effective sample rate in each quadrature channel of the received signals. Therefore, an adequate timing resolution for accurate symbol timing and data recovery is ensured. The symbol timing recovery is carried out by positioning the active symbol clock transition midway between successive zero crossings in the interpolated quadrature channels. A quality signal enables the determination of whether the symbol reception error is inside a predefined range. The clock extractor 646 then outputs the demodulated digital baseband signal 514 to the time division multiple access receiver (TDMA RX) circuit 506 of FIG. 5.

Figure 6B:
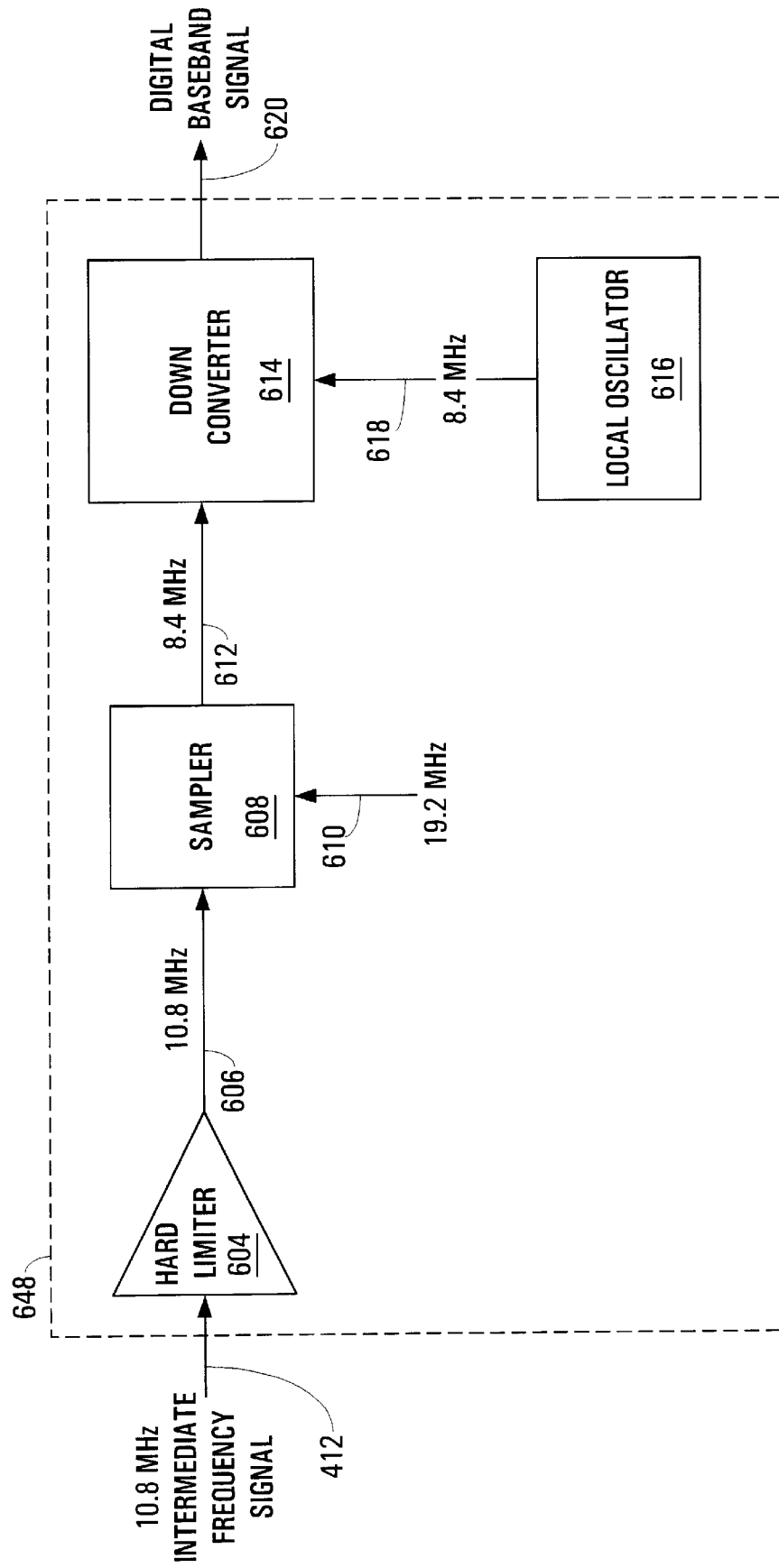
FIG. 6B illustrates another embodiment of the intermediate frequency down converter circuit of FIG. 6A in accordance with the present invention.

FIG. 6B illustrates another embodiment of the intermediate frequency down converter circuit 648 of FIG. 6A in accordance with the present invention. Within one embodiment of circuit 648 in accordance with the present invention, a 10.8 MHz intermediate frequency signal 412 is received by hard limiter circuit 604 from radio circuit 404 of FIG. 4. Hard limiter circuit 604 provides a threshold for the 10.8 MHz intermediate frequency signal by designating a value of one to the signal if it is greater than a threshold voltage and a value of zero to the signal if it is lower than the threshold voltage. In one embodiment, the threshold voltage is zero volts. The resulting output signal 606 of hard limiter circuit 604 is a 10.8 MHz intermediate frequency signal that has been hard limited.

Sampler circuit 608 of FIG. 6B receives the output intermediate frequency signal 606 from hard limiter circuit 604 and samples it with the personal handy phone system standard 19.2 MHz clock signal 610. The 19.2 MHz clock signal 610 is a standard frequency used within baseband circuits because it is an integral multiple of the symbol frequency, which is 192 kilobits per second for a great majority of baseband systems of the personal handy phone system 120 of FIG. 1B. It is therefore advantageous to utilize the personal handy phone system standard 19.2 MHz clock signal. It is important to point out that because of spectral leakage the present invention is able to digitally down convert intermediate frequency signal 606 using only one down conversion stage, even though clock signal 610 is not twice the frequency of sampled signal 606.

Due to spectral leakage of sampler circuit 608 of FIG. 6B, the 10.8 MHz intermediate frequency signal 606 that was input into sampler circuit 608 is output from the sampler circuit 608 as an 8.4 MHz intermediate frequency signal 612. The output 8.4 MHz intermediate frequency signal 612 has the same characteristics as the 10.8 MHz intermediate frequency signal 606 which was received by sampler circuit 608. The 8.4 MHz intermediate frequency signal 612 output from sampler circuit 608 is received by down converter circuit 614. Down converter circuit 614 performs a digital down conversion of the 8.4 MHz intermediate frequency signal 612 by multiplying it by an 8.4 MHz signal 618, produced by local oscillator circuit 616, resulting in a digital baseband signal 620. One embodiment of the digital baseband signal 620 within the present invention is a 384 kilobits per second signal. Digital baseband signal 620 is a digital recovered signal that contains communication information (e.g., voice/sound data) digitally as transistor-transistor logic (TTL) pulses. The resulting down converted digital baseband signal 620 is then transferred to the I/Q processor 640 of FIG. 6A. As described above, the intermediate frequency down converter circuit 648 of the present invention makes use of the above referenced spectral leakage to provide a system that utilizes only one digital down conversion stage to perform a direct digital down conversion of a 10.8 MHz intermediate frequency signal 412 into a digital baseband signal 620 within the personal handy phone system 120 of FIG. 1B.

Figure 7:
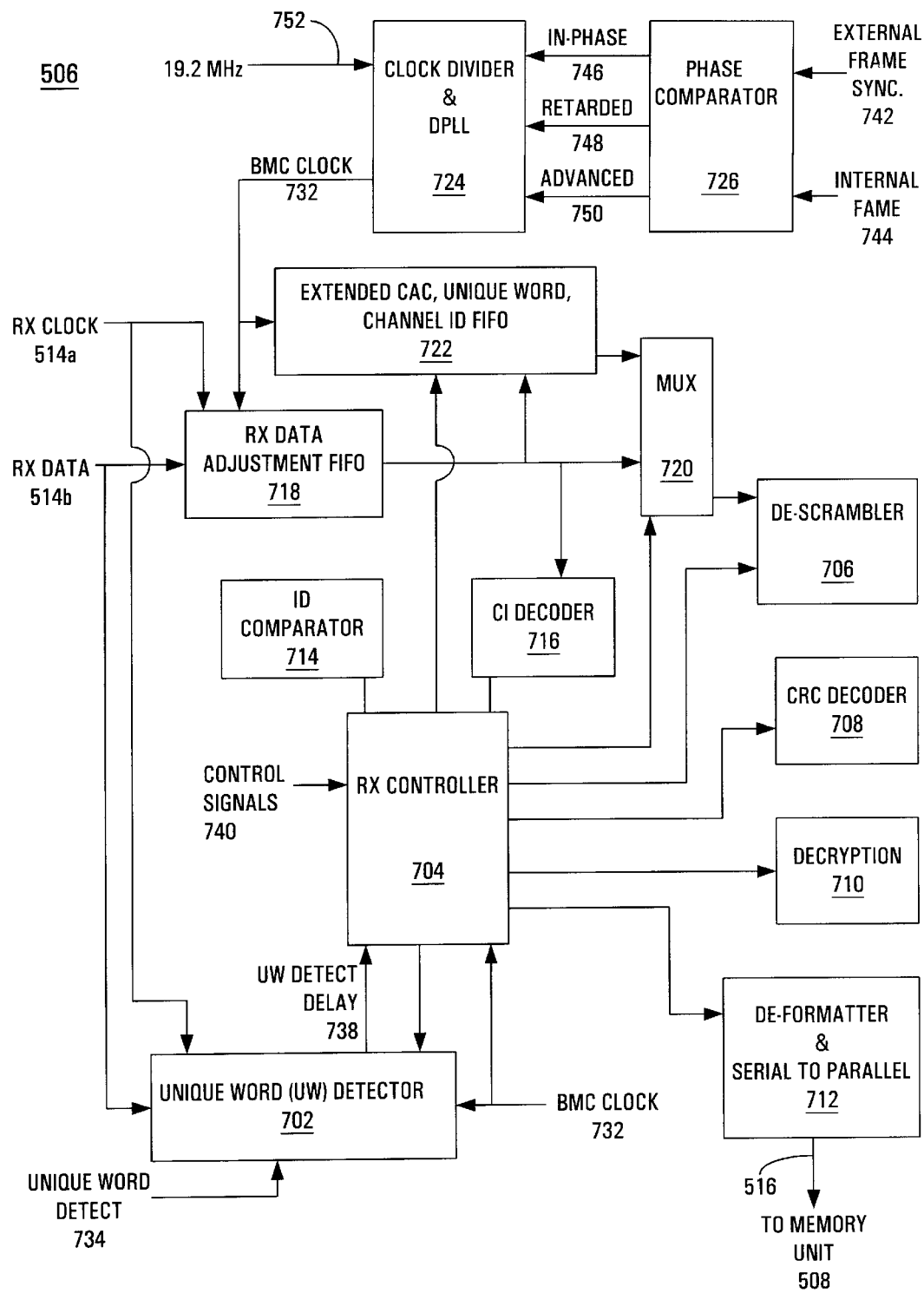
FIG. 7 illustrates a block diagram of the hardware used within the time division multiple access receiver (TDMA RX) circuit of FIG. 5 of one embodiment of the present invention.

FIG. 7 illustrates a block diagram of the hardware located within the time division multiple access receiver (TDMA RX) 506 of FIG. 5 of one embodiment of the present invention. Receiver (RX) controller circuit 704 communicates with multiplexer (MUX) circuit 720, de-scrambler circuit 706, cyclic redundancy check (CRC) decoder circuit 708, decryption circuit 710, de-formatter and serial to parallel circuit 712, extended common access channel (XCAC)/Unique Word (UW)/channel identifier (CI) first in first out (FIFO) circuit 722, unique word detector circuit 702, channel identifier (CI) decoder circuit 716 and identification comparator circuit 714. The extended common access channel (XCAC) mentioned above is defined as the same area within the personal handy phone system communication frame that initially contains the preamble data. RX controller 704 receives control signals 740 and burst mode controller (BMC) clock signal 732.

Multiplexer (MUX) circuit 720 of FIG. 7 communicates with de-scrambler circuit 706, which communicates with CRC decoder circuit 708. CRC decoder circuit 708 communicates with decryption circuit 710, which communicates with de-formatter and serial to parallel circuit 712. De-formatter and serial to parallel circuit 712 outputs the digital baseband signal 516 to the memory unit 508 of FIG. 5.

Unique Word detector circuit 702 of FIG. 7 communicates with RX controller 704, which includes transmitting it the UW detect delay signal 738. Unique Word detector circuit 702 receives BMC clock signal 732, Unique Word detect signal 734, RX clock signal 514a and RX data signal 514b. The RX clock signal 514a and the RX data signal 514b are both subcomponents of the demodulated digital baseband signal 514 of FIGS. 5 and 6A. Receiving (RX) data adjustment FIFO circuit 718 communicates with MUX 720, XCAC/UW/CI FIFO circuit 722 and CI decoder circuit 716. RX data adjustment FIFO circuit 718 receives RX clock signal 514a, RX data signal 514b and BMC clock signal 732. The XCAC/UW/CI FIFO circuit 722 communicates with MUX 720. FIFO circuit 722 receives BMC clock signal 732.

Phase comparator circuit 726 of FIG. 7 communicates with the clock divider and digital phase lock loop (DPLL) circuit 724, which includes transmitting it in phase signal 746, retarded signal 748 and advanced signal 750. Phase comparator 726 receives an external frame synchronization signal 742 and an internal frame signal 744. Clock divider and DPLL circuit 724 transmits BMC clock signal 732 to FIFO circuit 722, RX data adjustment FIFO circuit 718, RX controller 704 and Unique Word detector 702. Clock divider and DPLL circuit 724 receives a 19.2 megahertz signal 752.

Figure 8:
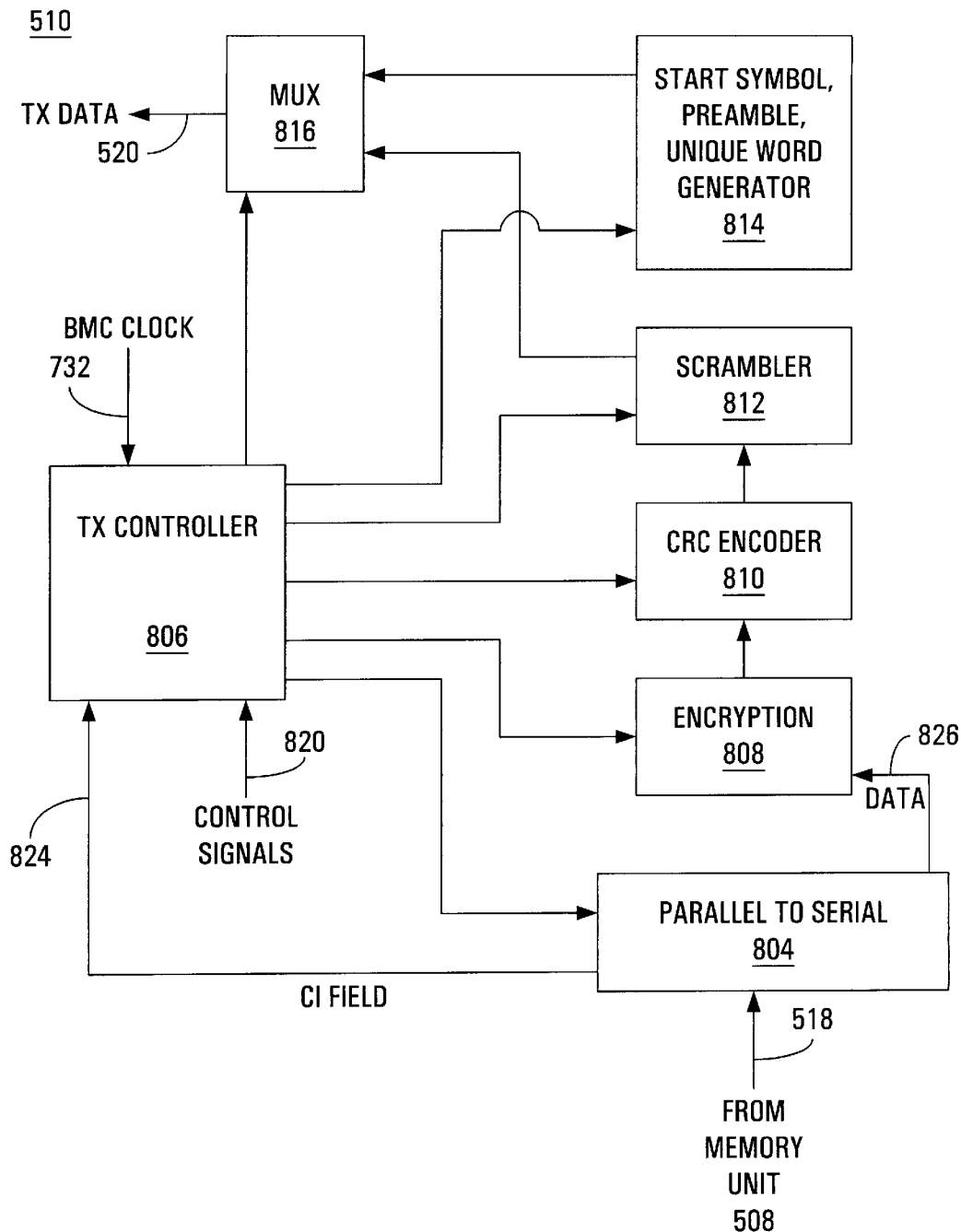
FIG. 8 illustrates a block diagram of the hardware used within the time division multiple access transmitter (TDMA TX) circuit of FIG. 5 of one embodiment of the present invention.

FIG. 8 illustrates a block diagram of the hardware located within the time division multiple access transmitter (TDMA TX) 510 of FIG. 5 of one embodiment of the present invention. Transmitter (TX) controller circuit 806 communicates with multiplexer (MUX) circuit 816, start symbol (SS)/preamble/Unique Word (UW) generator circuit 814, scrambler circuit 812, cyclic redundancy check (CRC) encoder circuit 810, encryption circuit 808 and parallel to serial circuit 804. TX controller 806 receives control signals 820 and burst mode controller (BMC) clock signal 732 of FIG. 7.

Parallel to serial circuit 804 of FIG. 8 communicates with TX controller circuit 806, which includes transmitting it channel identifier (CI) field signal 824. Parallel to serial circuit 804 communicates with encryption circuit 808, represented by data signal 826. Parallel to serial circuit 804 receives the outgoing digital baseband signal 518 from the memory unit 508 of FIG. 5.

Encryption circuit 808 of FIG. 8 communicates with CRC encoder circuit 810, which communicates with scrambler 812. Scrambler circuit 812 communicates with MUX circuit 816. SS/preamble/UW generator 814 outputs the digital baseband signal 520 to the modulator 512 of FIGS. 5.

Figure 9:
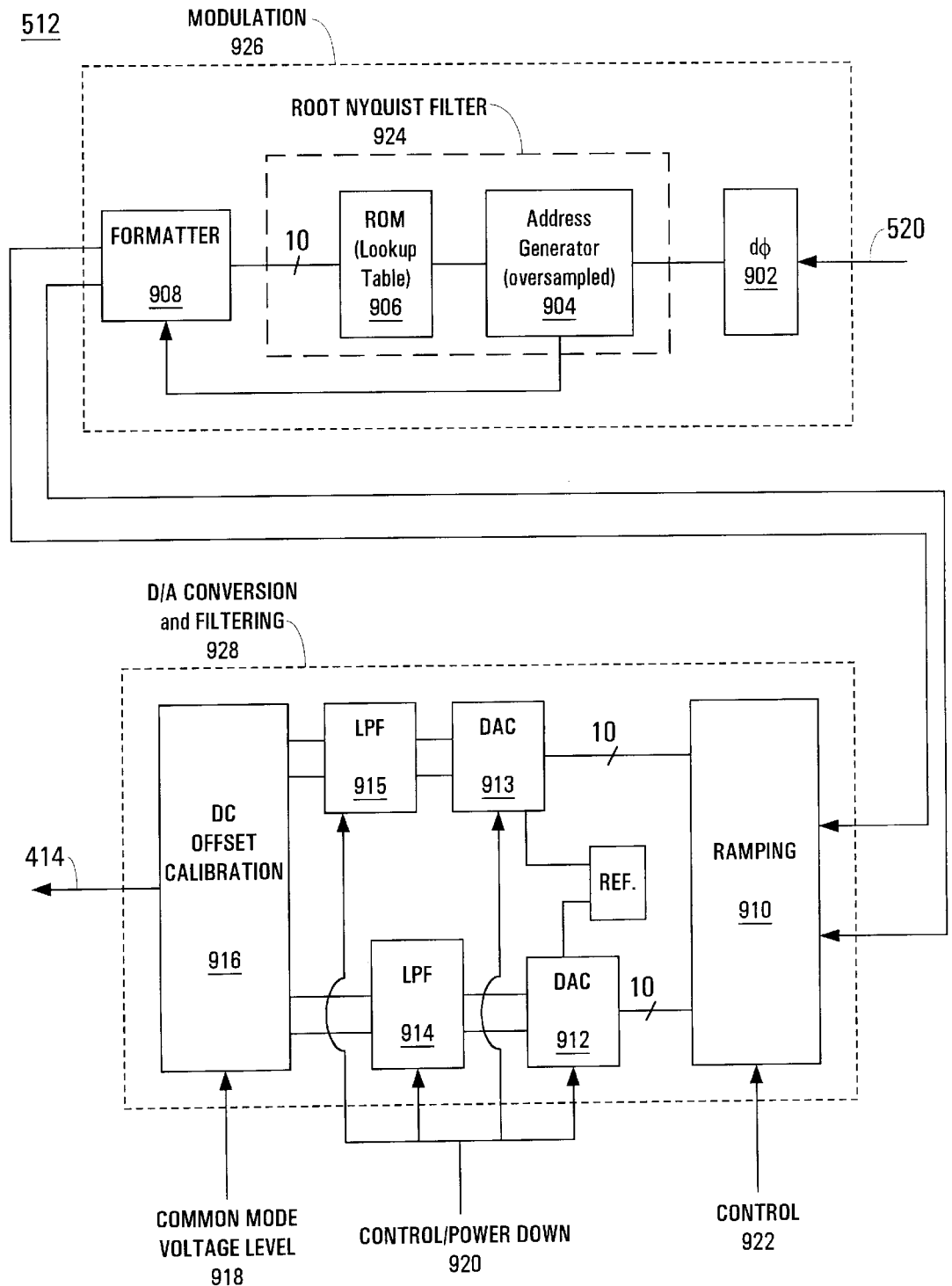
FIG. 9 illustrates a block diagram of the hardware used within the modulator circuit of FIG. 5 of one embodiment of the present invention.

FIG. 9 illustrates a block diagram of the hardware used within the modulator circuit 512 of FIG. 5 of one embodiment of the present invention. One embodiment of modulator circuit 512 consists of a π/4 shift QPSK modulator located within modulation circuit 926 followed by the digital to analog (D/A) conversion and filtering circuit 928. However, many other modulation circuits and D/A conversion and filtering circuits can be used within modulator circuit 512. The low pass filters (LPF) 914 and 915 shape the output spectrum to meet the personal handy phone system requirements for the adjacent channel attenuation.

The digital baseband signal 520 is received by the dφ circuit 902 of FIG. 9 where a serial/parallel conversion is done followed by the differential encoding, according to the personal handy phone system standard. Then an oversampling of the output is applied. The required pulse shaping Root Nyquist filter 924 defined in the personal handy phone system standard is realized as a Root Raised Cosine Filter, implemented with an address generator 904 and a read only memory (ROM) lookup table 906. A formatter 908 gives the final digital output signals.

The ramping circuit 910 of FIG. 9 of the D/A conversion and filtering circuit 928 receives the output signals from the formatter 908. The ramping circuit 910 also receives control signal 922. The digital to analog converters (DAC) circuits 912 and 913 receive the signals output from the ramping circuit 910 and convert them from digital signals to analog signals. One embodiment of DAC circuits 912 and 913 within the present invention is two 10 bit digital to analog converters. The output signals from the DAC circuits 912 and 913 get filtered by separate low pass filters (LPF) 914 and 915, respectively. To obtain better noise immunity, the DAC circuits 912 and 913 and the low pass filters 914 and 915 are differential devices. The common mode voltage level 918 of this differential outputs can be adjusted by software. The final differential analog intermediate frequency signal 414 is output to the radio circuit 404 of FIG. 4.

An automatic calibration process can be invoked within the direct current (DC) offset calibration circuit 916 of FIG. 9 to remove any direct current (DC) offset of the output intermediate frequency signal 414. This calibration process can be disabled and the entire calibration block bypassed. To reduce the power consumption of the digital to analog converters 912 and 913 and the low pass filters 914 and 915, they are controlled internally by control/power down signal 920. Therefore, they can be powered down separately by the control/power down signal 920 when not in use.

Another present invention embodiment for switching the communication mode of each slot within a communication interface involves an 8 bit register where each bit maps one slot. The state of each bit indicates to the core whether the corresponding slot is in portable station or cell station communication mode. The MPU can read and modify this register. Since modifying this register during an active slot might corrupt its behavior, any changes in this register is effectively taken into account at the beginning of the following frame. Implementation consists of a double flip flop: the register itself that can be updated by the MPU, followed by a second layer that updates only at the beginning of slot 0.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method within a personal handy phone system for enabling a wireless repeater to switch communication mode for each slot of a communication interface, said method comprising the steps of:

a) on first detection of a signal, determining whether a cell station or a first portable station of said personal handy phone system transmitted said signal;

b) said wireless repeater switching a first receiving slot of said communication interface to a cell station communication mode if said signal was transmitted by said first portable station, said first receiving slot for receiving said signal from said first portable station;

c) said wireless repeater switching said first receiving slot of said communication interface to a portable station communication mode if said signal was transmitted by said cell station, said first receiving slot for receiving said signal from said cell station;

d) said wireless repeater switching a first transmit slot of said communication interface to said cell station communication mode if said signal is to be transmitted to said first portable station, said first transmit slot for transmitting said signal to said first portable station; and e) said wireless repeater switching said first transmit slot of said communication interface to said portable station communication mode if said signal is to be transmitted to said cell station, said first transmit slot for transmitting said signal to said cell station, wherein said communication interface comprises a predetermined number of receive slots and a predetermined number of transmit slots.

2. A method as described in claim 1 wherein said communication interface has a time division multiple access capability having frames that are time division duplexed and wherein a single frame is 5 milliseconds and contains eight communication slots including four receiving slots and four transmit slots.

3. A method as described in claim 1 further comprising the steps of:

f) receiving a second signal from said cell station; and g) said wireless repeater switching a second transmit slot of said communication interface to said cell station communication mode if said signal is to be transmitted to a second portable station, said second transmit slot for transmitting said second signal to said second portable station.

4. A method as described in claim 1 wherein said signal is a digital signal.

5. A method as described in claim 2 wherein said step c) further comprises the step of synchronizing said receive slot to said signal if said signal was transmitted by said cell station.

6. A method as described in claim 2 wherein said step c) further comprises the step of determining from said signal a transmit slot position with which to transmit said signal.

7. A method within a personal handy phone system for enabling a wireless repeater to switch communication mode for each slot of a communication interface, said method comprising the steps of:

a) on first detection of a signal, determining whether a cell station or a first portable station of said personal handy phone system transmitted said signal;

b) said wireless repeater switching a first receiving slot of said communication interface to a cell station communication mode if said signal was transmitted by said first portable station, said first receiving slot for receiving said signal from said first portable station;

c) said wireless repeater switching said first receiving slot of said communication interface to said portable station communication mode if said signal was transmitted by said cell station, said first receiving slot for receiving said signal from said cell station;

d) said wireless repeater switching a first transmit slot of said communication interface to said cell station communication mode if said signal is to be transmitted to said first portable station, said first transmit slot for transmitting said signal to said first portable station;

e) said wireless repeater switching said first transmit slot of said communication interface to said portable station communication mode if said signal is to be transmitted to said cell station, said first transmit slot for transmitting said signal to said cell station; and f) said wireless repeater transmitting said signal using said first transmit slot configured under either said cell station communication mode or said personal station communication mode, wherein said communication interface comprises a predetermined number of receive slots and a predetermined number of transmit slots.

8. A method as described in claim 7 wherein said communication interface has a time division multiple access capability having frames that are time division duplexed and wherein a single frame is 5 milliseconds and contains eight communication slots including four receiving slots and four transmit slots.

9. A method as described in claim 7 further comprising the steps of:

receiving a second signal from said cell station;

said wireless repeater switching a second transmit slot of said communication interface to said cell station communication mode if said signal is to be transmitted to a second portable station, said second transmit slot for transmitting said second signal to said second portable station; and said wireless repeater transmitting said signal using said second transmit slot configured under either said cell station communication mode or said personal station communication mode.

10. A method as described in claim 7 wherein said signal is a digital signal.

11. A method as described in claim 8 wherein said step c) further comprises the step of synchronizing said receive slot to said signal if said signal was transmitted by said cell station.

12. A method as described in claim 8 wherein said step c) further comprises the step of determining from said signal a transmit slot position with which to transmit said signal.

* * * * *